(No Model.)

G. H. HAYWARD.
WHIFFLETREE HOOK.

No. 540,439. Patented June 4, 1895.

WITNESSES:
A. D. Harrison
Rollin Abell

INVENTOR:
George H. Hayward
by Wright, Brown & Quinby
Attys

UNITED STATES PATENT OFFICE.

GEORGE H. HAYWARD, OF NORTH READING, MASSACHUSETTS.

WHIFFLETREE-HOOK.

SPECIFICATION forming part of Letters Patent No. 540,439, dated June 4, 1895.

Application filed February 16, 1895. Serial No. 538,624. (No model.)

*To all whom it may concern:*

Be it known that I, GEORGE H. HAYWARD, of North Reading, in the county of Middlesex and State of Massachusetts, have invented certain new and useful Improvements in Whiffletree-Hooks, of which the following is a specification.

This invention relates to improvements in trace-hooks, and consists in a hook portion of particular construction adapted to being secured to a whiffletree and to receive the end portion or eye of a trace, and a spring guard of particular construction acting conjointly with the said hook.

The object of my invention is to provide a trace-hook from which the trace cannot by any chance become displaced and which shall be simple, strong, and durable, and neat in appearance.

Figure 1:
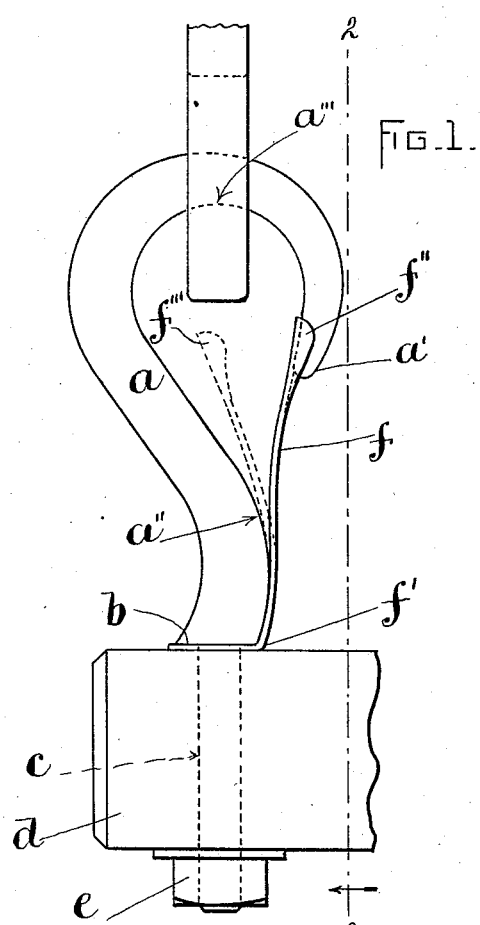
Figure 2:
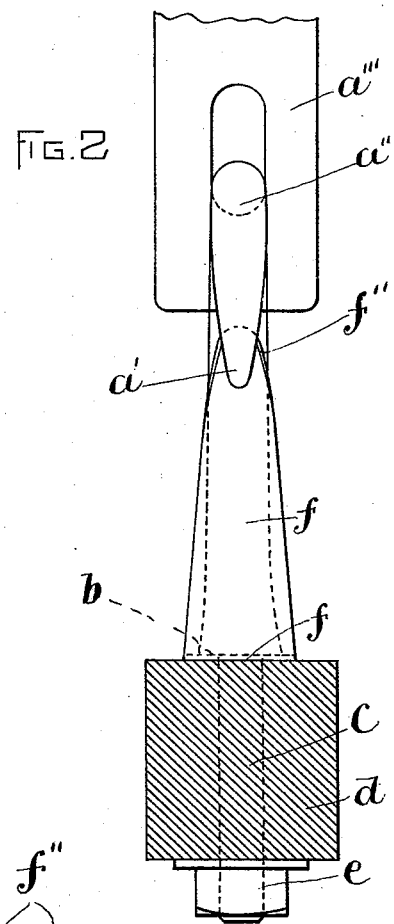
Figures 3, 4:
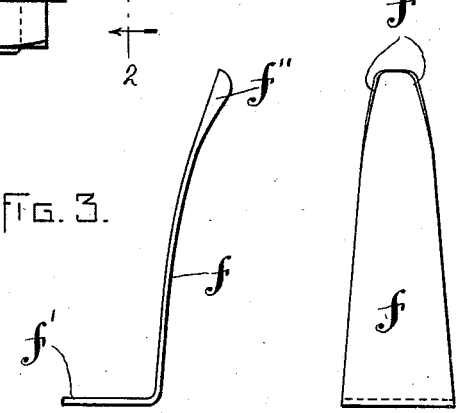
Figure 5:
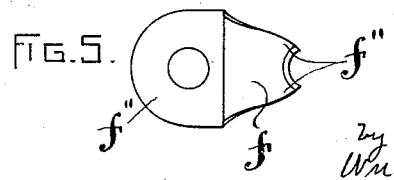

Of the accompanying drawings, forming a part of this specification, Figure 1 is a side view of my improved trace-hook complete. Fig. 2 is an edge view of the same. Fig. 3 is a side view of the spring-guard. Fig. 4 is a face view of Fig. 3. Fig. 5 is a plan view of Fig. 3.

Corresponding parts in the several views are denoted by like letters of reference.

$a$ is the body of the hook, having the shoulder $b$ and the screw-threaded shank $c$ passed through a hole or socket in the whiffletree $d$, the whole being secured thereto by means of the nut $e$. Interposed between the shoulder $b$ and the whiffletree $d$ and firmly held thereby, is the fixed end of the spring $f$ comprising a perforated ear $f'$ bent at right angles with the free end of the said spring, which end is arranged to press outwardly against the curved inner side of the hook $a$ near the point $a'$ thereof and provided with the outwardly bent ears $f''$, which engage the sides of the point $a'$ of the hook and prevent lateral displacement of the spring. Another advantage of this formation of the spring is that accidental escape of the trace from the hook by working between the spring and hook is prevented. This is not so apparent where the thick leather trace itself is engaged with the hook as where one link of a chain-trace is engaged with the hook. It is to be particularly noted that the spring has a transverse curvature at the end conforming to that of the hook and thus the spring lies closely over the inner side of the hook, and there is no projection of the spring to give the trace a chance to work behind it and then escape from the hook. In order that this transverse curvature of the spring shall be of any advantage in guarding against the accidental escape of the trace, it is important that the spring should terminate at its free end with that end lying close against the hook, otherwise the object would be defeated—that is to say, even if the spring is curved around the hook, the extension of the spring beyond this curved portion on an inward bend away from the hook would give the trace a chance to work out. While such a construction may be satisfactory in some connections, it would not be altogether safe in a trace-hook.

The inner side of the hook at $a''$ is so curved in relation to the spring $f$ as to constitute a variable fulcrum when the spring is bent away from the point, as shown by the dotted lines $f'''$, in the operation of attaching or detaching the trace. The spring $f$ is so formed that when put in place and the whole structure secured in position, the spring has to be bent back in order to go behind the hook-end, thus producing an initial stress which holds the spring firmly against the point of the hook, preventing any rattle or noise.

The outer or extreme bend of the hook at $a'''$ which engages the trace $g$ is located in line with the longitudinal axis of the shank $c$, and hence the pull of the trace is in line with the said shank.

A common fault of snap-hooks of the class employing a flat spring fastened to the base of the hook-body and having the free end behind the point of the hook, is the proneness of the spring to become displaced laterally by reason of the loosening of its fastenings. It is to be particularly noted that the constructions of my hook-body and confining spring or snap, combine to effectually prevent such lateral displacement of the spring. It will be seen that lateral movement of the spring in its free part, $f$, is directly resisted by the shoulder, $b$, of the hook-body, for lateral movement of the spring would necessarily involve outward movement of the ear, $f'$, toward said shoulder. This result it is apparent is due to the angular form of the spring combined with the shouldered hook-body.

I claim—

In a whiffletree hook, the combination of the hook proper having a base-shoulder and a reduced shank to pass through the whiffletree, said shank being screw-threaded to receive a nut; and a flat spring having an ear extending substantially at right angles to its main portion and perforated to embrace the reduced shank of the hook, the main portion of said spring extending behind the point-end of the hook and curved transversely at its end to lie closely against the hook,—the clamping of the spring-ear between the shoulder of the hook and the whiffletree, and the engagement of the curved end of the spring with the hook, combining to prevent displacement of the spring in any direction, and the close engagement of the end of the spring with the hook, preventing accidental escape of the trace, substantially as described.

In testimony whereof I have signed my name to this specification, in the presence of two subscribing witnesses, this 21st day of January, A. D. 1895.

GEORGE H. HAYWARD.

Witnesses:
 WM. H. CLOUGH,
 BENJAMIN G. HALL.